United States Patent [19]

Maejima et al.

[11] Patent Number: 5,037,543
[45] Date of Patent: Aug. 6, 1991

[54] ASSEMBLAGE OF HYDROXYL APATITE PARTICLES AND LIQUID CHROMATOGRAPHY COLUMN USING THE SAME

[75] Inventors: Tsugio Maejima; Kimio Tamai, both of Saitama; Tetsuo Kanakubo, Kawagoe; Masao Yoshizawa, Tokyo; Nobuaki Tagaya, Kawagoe; Hideyuki Kuwahara, Ooimachi; Takao Hashimoto, Ooimachi; Noriko Komatsu, Ooimachi; Keiko Fukamachi, Mitaka, all of Japan

[73] Assignee: Toa Nenryo Koyo K. K., Tokyo, Japan

[21] Appl. No.: 549,558

[22] Filed: Jul. 9, 1990

Related U.S. Application Data

[63] Continuation of Ser. No. 251,054, Sep. 26, 1988, abandoned, which is a continuation of Ser. No. 32,385, Mar. 31, 1987, abandoned.

[30] Foreign Application Priority Data

Mar. 31, 1986 [JP] Japan ................................. 61-71048
Mar. 31, 1986 [JP] Japan ................................. 61-73946

[51] Int. Cl.$^5$ ............................................. B01D 15/08
[52] U.S. Cl. ............................. 210/198.2; 210/502.1; 210/510.1; 423/308
[58] Field of Search ................... 210/635, 656, 198.2, 210/502.1, 510.1; 502/8, 208, 400; 423/308

[56] References Cited

U.S. PATENT DOCUMENTS

| | | | |
|---|---|---|---|
| 3,488,922 | 1/1970 | Kirkland | 210/198.2 |
| 3,509,070 | 4/1970 | Lapdius | 423/308 |
| 3,737,516 | 6/1973 | Jenner | 423/308 |
| 4,070,283 | 1/1978 | Kirkland | 210/656 |
| 4,070,286 | 1/1978 | Iler | 210/198.2 |
| 4,131,542 | 12/1978 | Bergna | 210/542 |
| 4,335,086 | 6/1982 | Spencer | 423/308 |
| 4,389,385 | 6/1983 | Ramsay | 210/198.2 |
| 4,477,492 | 10/1984 | Bergna | 210/198.2 |
| 4,483,733 | 1/1984 | Yang | 210/656 |
| 4,497,075 | 2/1985 | Niwa | 423/308 |
| 4,636,316 | 1/1987 | Harris | 210/198.2 |
| 4,655,917 | 4/1987 | Shackelford | 210/198.2 |
| 4,659,617 | 4/1987 | Fujii | 428/221 |
| 4,676,898 | 6/1987 | Saxena | 210/656 |
| 4,698,317 | 10/1987 | Inoue | 501/9 |
| 4,711,769 | 12/1987 | Inoue | 423/308 |
| 4,781,904 | 11/1988 | Tagaya | 423/308 |
| 4,794,171 | 12/1988 | Tagaya | 423/308 |
| 4,985,143 | 1/1991 | Freeman | 210/657 |

FOREIGN PATENT DOCUMENTS

| | | | |
|---|---|---|---|
| 0026090 | 4/1981 | European Pat. Off. | 210/198.2 |
| 205622 | 12/1986 | European Pat. Off. | 210/198.2 |
| 59-145087 | 8/1984 | Japan | 210/502.1 |
| 60-198458 | 10/1985 | Japan | 210/198.2 |
| 710928 | 1/1980 | U.S.S.R. | 502/208 |

OTHER PUBLICATIONS

Abstract of Japan Patent No. 60-198458(A) published Mar. 4, 1986 Kouken, vol. 10, No. 53 (P-433).
Snyder, Introduction to Modern Liquid Chromatography, John Wiley & Sons, Inc., New York, 1979, pp. 177–180 & 203–204.
Pachla, Precolumn for High Performance Liquid Chromatography, Analytical Chemistry, vol. 48, No. 1, Jan. 1976, p. 237.
Kouken, K. K. Column for Chromatography, vol. 10, No. 53 (P-433) (2110), Mar. 4, 1986, Abstract.

Primary Examiner—Ernest G. Therkorn
Attorney, Agent, or Firm—Birch, Stewart, Kolasch & Birch

[57] ABSTRACT

An assemblage of hydroxyl apatite particles having small and uniform particle size. The median of the particle size is 1 to 10 $\mu$m, and at least 90% of the particles in the assemblage have a particle size of not more than 25 $\mu$m. The assemblage can be used to pack a liquid chromatography column.

5 Claims, 1 Drawing Sheet

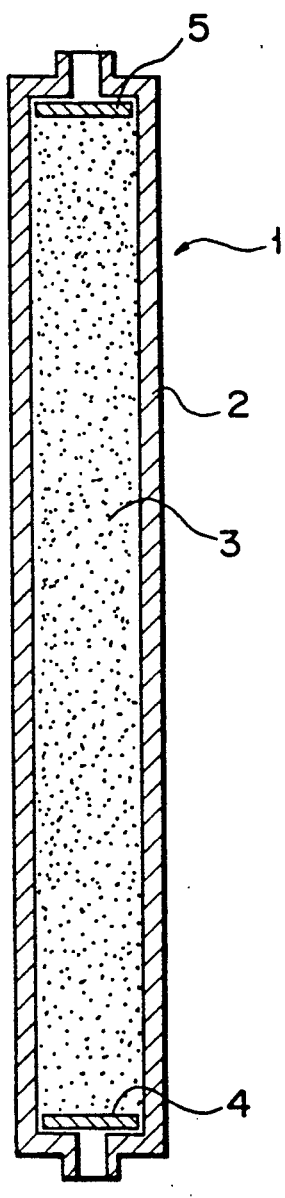

ASSEMBLAGE OF HYDROXYL APATITE PARTICLES AND LIQUID CHROMATOGRAPHY COLUMN USING THE SAME

This application is a continuation of application Ser. No. 07/251,054 filed on Sept. 26, 1988, which is a continuation of application Ser. No. 07/032,385, filed on Mar. 31, 1987, both of which are now abandoned.

BACKGROUND OF THE INVENTION

I. Field of the Invention

This invention relates to an assemblage of hydroxyl apatite particles. The assemblage can be used as an efficient packing for liquid chromatography columns.

II. Description of the Prior Art

Hydroxyl apatite is now widely used for packing in liquid chromatography columns for separating biological macromolecules such as proteins and nucleic acids. A conventional hydroxyl apatite packing for liquid chromatography is manufactured by finely pulverizing plate-like crystals of hydroxyl apatite which is usually manufactured by a so called hydrothermal synthesis process in which calcium hydrogenphosphate is hydrolyzed at, for example, 200° C. and under a pressure of, for example, 15 atms.

The particle size of a conventional assemblage of hydroxyl apatite particles used for liquid chromatography column packing is not very uniform, and the average particle size is large. Thus, the separation efficiency of the liquid chromatography is not satisfactory. Further, since the crystals of the hydroxyl apatite particles have a plate-like shape, the efficiency of the chromatography varies depending on the packing method of the hydroxyl apatite particles and on the operation parameters of the liquid employed.

SUMMARY OF THE INVENTION

Accordingly, an object of the present invention is to provide an assemblage of hydroxyl apatite particles of substantially spherical shape, which have a particle size that is very small and uniform.

Another object of the present invention is to provide a process for producing an assemblage.

Still another object of the present invention is to provide a liquid chromatography column which has a high separation efficiency.

The present invention provides an assemblage of hydroxyl apatite particles of substantially spherical shape, the median of the particle size (diameter) of the particles being 1 to 10 μm, and at least 90% of the particles in the assemblage having a particle size of not more than 25 μm.

The present invention further provides a process of producing the assemblage of the present invention comprising spraying a slurry of hydroxyl apatite having a concentration of 0.1 to 20% by weight into an air flow having a temperature of 50° to 300° C.

The present invention still further provides a column for liquid chromatography comprising a hollow tube and a packing contained in the tube, the packing essentially consisting of the assemblage of the present invention.

According to the present invention, an assemblage of hydroxyl apatite particles of substantially spherical shape, which have particle size that is uniform and very small is provided. The liquid chromatography column containing this assemblage as the packing has a high separation efficiency since the hydroxyl apatite particles are substantially spherical and the particle size thereof is uniform and very small.

BRIEF DESCRIPTION OF THE DRAWING

The accompanying drawing shows a schematic sectional view of the liquid chromatography column of the present invention.

DETAILED DESCRIPTION OF THE PREFERRED EMBODIMENTS

The hydroxyl apatite particles in the assemblage of the present invention has a median particle size of 1 to 10 μm, and at least 90% of the particles have a particle size of not more than 25 μm. The shape of the particles is substantially spherical. According to the preferred embodiment of the present invention, the median of the particle size is 1 to 6 μm, and at least 90% of the particles have a particle size of not more than 15 μm. According to the still more preferred embodiment of the present invention, the median of the particle size is 1 to 3 μm, and at least 90% of the particles have a particle size of not more than 7 μm.

The assemblage of hydroxyl apatite particles of the present invention can be produced by spraying a slurry of hydroxyl apatite of a prescribed concentration into an air flow of a prescribed temperature. Hydroxyl apatite herein means needle-shaped hydroxyl apatite microcrystals suspended in water or in a water containing calcium and/or phosphate ions and/or other additives such as dispersants and coagulants. The concentration of hydroxyl apatite in the slurry is from 0.1 to 20% by weight, and preferably 1 to 10% by weight. Such a hydroxyl apatite slurry may be produced by known processes as follows:

(1) A wet synthesis process utilizing aqueous reaction in which a water-soluble calcium salt and a water-soluble phosphate are reacted in an aqueous solution;

(2) A wet synthesis process utilizing solid reaction at a high temperature, in which calcium phosphate is reacted with calcium carbonate under the presence of water vapor at 900° to 1400° C.; and (3) A hydrothermal synthesis process in which calcium hydrogenphosphate is hydrolyzed at 200° C., 15 atms.

Needless to say, hydroxyl a apatite slurry can be obtained by dispersing needle-like hydroxyl apatite microcrystals in water or in an aqueous solution containing calcium and/or phosphate ions.

The hydroxyl apatite slurry is then sprayed in an air flow having a temperature of 50° to 300° C., more preferably 100° to 200° C., and most preferably 110° to 170° C. This spraying step may be conducted by using a conventional commercially available spray-drying apparatus having various types of atomizers such as, for example, a nozzle atomizer and a rotary atomizer. A nozzle atomizer is more suitable to prepare the assemblage of the hydroxyl apatite particles of the present invention. The spraying pressure may be, for example, 0.1 to 5 kg/cm², and preferably 0.3 to 3 kg/cm². When a disk-type sprayer is used, the revolution of the disk may be, for example, 1,000 to 50,000 rpm, and preferably 5,000 to 25,000 rpm. The sprayed hydroxyl apatite particles may be recovered by using, for example, a cyclon which is a box connected to the lower portion of the main body of a spray-drying apparatus through a duct.

By the above-described process, the assemblage of hydroxyl apatite particles of the present invention with uniform and small particle size may be obtained.

The present invention further provides a liquid chromatography column having high efficiency. A schematic sectional view of the liquid chromatography column of the present invention is shown in the accompanying drawing. The column 1 of the present invention comprises a tube 2 and a packing 3 contained therein, and the packing 3 essentially consists of the above-described assemblage of the hydroxyl apatite particles of the present invention. The column 1 further comprises a filter 4 at the lower portion of the column 1. The pore size of the filter 4 must be smaller than the particle size of the hydroxyl apatite particles in the packing in order to prevent the escape of the hydroxyl apatite particles constituting the packing 3 from the tube 2. The column 1 preferably has a similar filter 5 at the upper portion of the column 1, which also prevents the packing particles from getting out of the tube 2. Thus, the structure of the liquid chromatography column, except for the packing, is conventional.

In a preferred embodiment of the liquid chromatography column of the present invention, the packing density of the packing is at least 40%, more preferably 50% or more, more preferably 55% or more, still more preferably 65% or more, and most preferably 75% or more. The term "packing density" as used herein means the percent ratio of the remainder given by subtracting the void volume of the packing (volume of the space among the particles) from the overall volume of the packing, to the overall volume of the packing. For example, if the overall volume of the packing is 10 ml, and the void or free space among the hydroxyl apatite particles constituting the packing is 4 ml, the packing density is 60%.

The process for obtaining a liquid chromatograpy column with such a high packing density was first found by the present inventors, and the process may also be applied to any packing other than hydroxyl apatite particles. In the process, the tube 2 is first provided with the filter 4 at the lower end thereof. Then a packer is connected to the upper end of the tube 2. The packer may preferably be in the form of a tube. The diameter of the packer may be the same as that of the tube 2. To increase the packing density, the packer has preferably a sufficient length. The length of the packer may be, for example, 5 times that of the tube 2. A suspension of hydroxyl apatite is then poured into the tube via the packer while substantially vertically positioning the tube 2. The medium of the suspension may preferably be eluate such as, for example, a phosphate buffer used in liquid chromatography. The concentration of the hydroxyl apatite particles in the suspension may preferably be 4 to 10 w/v%. The hydroxyl apatite particles should be uniformly dispersed in the suspension. The uniform dispersion may be obtained by using an ultrasonicator. The pouring step of the suspension is preferably conducted quickly. That is, the pouring is preferably conducted such that the suspension falls into the packer. The pouring step of the suspension is preferably conducted until the suspension begins to overflow from the upper end of the packer. After filling the tube 2 and the packer with the suspension of hydroxyl apatite particles, the upper end of the packer is covered with a filter which does not pass the hydroxyl apatite particles but passes the medium of the suspension. Then a liquid medium is pumped into the tube 2 via the packer. The medium may preferably be an eluate of liquid chromatography, and is preferably the same as the medium of the suspension. The maximum pumping pressure may be 50 to 500 kg/cm². The maximum pumping pressure may be controlled by a well-known conventional maximum and minimum pressure controller. The flow rate of the medium when pumping the same into the packer and the tube 2 may be suitably selected, and may be, for example, 1.0 ml/min. to 2.0 ml/min. To attain a uniformity of the packed particles, it is preferred to use a non-pulsating pump. The pumping of the suspension may preferably be continued until the same volume of the medium which is pumped into the packer flows out of the lower end of the tube 2. After the pumping step is completed, the packer is removed from the tube 2, and the filter 5 is provided at the upper end portion of the tube 2.

In the above-mentioned preferred embodiment of the liquid chromatography column of the present invention, since the packing density thereof is greater than conventional liquid chromatography columns, the separation efficiency is greater than the conventional columns if the size of the columns are identical. In other words, if the separation efficiency of the chromatography column of the preferred embodiment of the present invention is the same as a conventional column, the size of the column of the present invention is smaller than the conventional column.

Although the assemblage obtained by the above-mentioned process may be used as packing without any treatment, it is preferable to dry the assemblage at 80° to 120° C. for 0.1 to 10 hours, and then calcine the dried assemblage at 400° to 700° C. for 1 to 3 hours.

EXAMPLE 1

Hydroxyl apatite slurry containing 5% by weight of hydroxyl apatite was sprayed from a nozzle atomizer to an air flow having a temperature of 140° C., and the produced particles were collected in a cyclon. The thus obtained assemblage of hydroxyl apatite particles was dried at 100° C. for 3 hours. The assemblage was then divided into 6 groups, and each group was calcined under the conditions shown in Table 1 to 6, respectively, and the distribution of the particle size was determined for each group. The particle size distribution was determined by using a commercially available automatic particle size distribution-measuring apparatus (Horiba CAPA-300, manufactured by Horiba Seisakusho, Kyoto, Japan) using water as the dispersion medium. The method of measuring the particle size distribution is based on the combination of the Stokes' equation of sedimentation and the proportional relationship between the absorbance and the concentration of particles, and the parameters thereof were as follows:

Coefficient of Viscosity of Dispersion Medium: 0.96 centipoise
Density of Dispersion Medium: 1.00 g/ml
Density of Samples: 3.21 g/ml
Maximum Particle Size: 10.00 μm
Minimum Particle Size: 1.00 μm
Measuring Time: 6 min. 20 sec. 5
Revolution: 500 rpm The results are shown in Tables 1 to 6.

TABLE 1

| | Calcining Conditions: 580° C., 3 hours | |
|---|---|---|
| Particle Size (μm) | Frequency Distribution (%) | Cumulative Distribution (%) |
| 0.00–1.00 | 8.2 | 8.2 |

TABLE 1-continued

| | Calcining Conditions: 580° C., 3 hours | |
|---|---|---|
| Particle Size (μm) | Frequency Distribution (%) | Cumulative Distribution (%) |
| 1.00–2.00 | 39.0 | 47.2 |
| 2.00–3.00 | 27.4 | 74.6 |
| 3.00–4.00 | 11.8 | 86.4 |
| 4.00–5.00 | 4.9 | 91.3 |
| 5.00–6.00 | 2.6 | 93.9 |
| 6.00–7.00 | 0.8 | 94.7 |
| 7.00–8.00 | 1.5 | 96.2 |
| 8.00–9.00 | 0.8 | 97.0 |
| 9.00–10.00 | 0.6 | 97.6 |
| >10.00 | 2.4 | 100.0 |

Median of the Particle Size: 2.10 μm

TABLE 2

| | Calcining Conditions: 700° C., 3 hours | |
|---|---|---|
| Particle Size (μm) | Frequency Distribution (%) | Cumulative Distribution (%) |
| 0.00–1.00 | 9.0 | 9.0 |
| 1.00–2.00 | 36.7 | 45.7 |
| 2.00–3.00 | 27.8 | 73.5 |
| 3.00–4.00 | 12.2 | 85.7 |
| 4.00–5.00 | 4.9 | 90.6 |
| 5.00–6.00 | 2.8 | 93.4 |
| 6.00–7.00 | 0.4 | 93.8 |
| 7.00–8.00 | 1.7 | 95.5 |
| 8.00–9.00 | 1.3 | 96.8 |
| 9.00–10.00 | 0.4 | 97.2 |
| >10.00 | 2.8 | 100.0 |

Median of the Particle Size: 2.15 μm

TABLE 3

| | Calcining Conditions: 900° C., 3 hours | |
|---|---|---|
| Particle Size (μm) | Frequency Distribution (%) | Cumulative Distribution (%) |
| 0.00–1.00 | 12.1 | 12.1 |
| 1.00–2.00 | 35.8 | 47.9 |
| 2.00–3.00 | 27.4 | 75.3 |
| 3.00–4.00 | 11.5 | 86.8 |
| 4.00–5.00 | 4.9 | 91.7 |
| 5.00–6.00 | 2.3 | 94.0 |
| 6.00–7.00 | 0.4 | 94.4 |
| 7.00–8.00 | 1.2 | 95.6 |
| 8.00–9.00 | 1.7 | 97.3 |
| 9.00–10.00 | 1.3 | 98.6 |
| >10.00 | 1.4 | 100.0 |

Median of the Particle Size: 2.07 μm

TABLE 4

| | Calcining Conditions: 100° C., 3 hours | |
|---|---|---|
| Particle Size (μm) | Frequency Distribution (%) | Cumulative Distribution (%) |
| 0.00–1.00 | 10.8 | 10.8 |
| 1.00–2.00 | 39.7 | 50.5 |
| 2.00–3.00 | 25.8 | 76.3 |
| 3.00–4.00 | 10.7 | 87.0 |
| 4.00–5.00 | 4.0 | 91.0 |
| 5.00–6.00 | 2.1 | 93.1 |
| 6.00–7.00 | 0.5 | 93.6 |
| 7.00–8.00 | 1.0 | 94.6 |
| 8.00–9.00 | 1.1 | 95.7 |
| 9.00–10.00 | 0.7 | 96.4 |
| >10.00 | 3.6 | 100.0 |

Median of the Particle Size: 1.99 μm

TABLE 5

| | Calcining Conditions: 200° C., 3 hours | |
|---|---|---|
| Particle Size (μm) | Frequency Distribution (%) | Cumulative Distribution (%) |
| 0.00–1.00 | 11.7 | 11.7 |
| 1.00–2.00 | 37.0 | 48.7 |
| 2.00–3.00 | 26.7 | 75.4 |
| 3.00–4.00 | 11.4 | 86.8 |
| 4.00–5.00 | 3.9 | 90.7 |
| 5.00–6.00 | 2.5 | 93.2 |
| 6.00–7.00 | 1.9 | 95.1 |
| 7.00–8.00 | 0.5 | 95.6 |
| 8.00–9.00 | 1.1 | 96.7 |
| 9.00–10.00 | 0.9 | 97.6 |
| >10.00 | 2.4 | 100.0 |

Median of the Particle Size: 2.05 μm

TABLE 6

| | Calcining Conditions: 300° C., 3 hours | |
|---|---|---|
| Particle Size (μm) | Frequency Distribution (%) | Cumulative Distribution (%) |
| 0.00–1.00 | 11.1 | 11.1 |
| 1.00–2.00 | 38.1 | 49.2 |
| 2.00–3.00 | 26.6 | 75.8 |
| 3.00–4.00 | 11.5 | 87.3 |
| 4.00–5.00 | 4.1 | 91.4 |
| 5.00–6.00 | 2.4 | 93.8 |
| 6.00–7.00 | 0.9 | 94.7 |
| 7.00–8.00 | 1.1 | 95.8 |
| 8.00–9.00 | 1.0 | 96.8 |
| 9.00–10.00 | 0.4 | 97.2 |
| >10.00 | 2.8 | 100.0 |

Median of the Particle Size: 2.03 μm

As shown in Tables 1 to 6, in the above example of the present invention, assemblages of hydroxyl apatite particles which have a median particle size of as small as about 2 μm, and in which more than 90% of the particles are smaller than about 5 μm, were obtained.

EXAMPLE 2

On the lower end of a column made of stainless steel with an inner diameter of 8.5 mm and a length of 10 cm, a clasp having a filter of 5 μm thickness was secured. To the uppermost end of the column, a packer in the form of a stainless steel tube with inner diameter of 8.5 mm and a length of 50 cm was connected by means of a union. The column and the packer was vertically positioned with a clamp. The hydroxyl apatite particles obtained in Example 1 were mixed with a 35 ml of medium to a concentration of 10 w/v%, and the mixture was gently stirred. The medium contained 53.7 g of $Na_2HPO_4 \cdot 12H_2O$, 23.4 g of $NaH_2PO_4 \cdot 2H_2O$, 0.0015 g of $CaCl_2 \cdot 2H_2O$ and 0.5 g of $NaN_3$ in 100 ml of distilled water, and the pH of the medium was adjusted to 6.8 with 0.5N NaOH or 0.5N HCl. The container containing the suspension was placed in a water bath on a ultrasonicator for 5 seconds to uniformly disperse the particles in the suspension. The suspension was removed from the water bath on the ultrasonicator and was quickly poured into the packer and the tube from the top of the packer. The pouring was stopped when the suspension started to overflow from the top of the packer. A clasp with a filter of 5 μm thickness was quickly secured to the top of the packer. The above mentioned medium was then pumped into the packer and the tube at a rate of 1.5 ml/min. via the filter on the top of the packer with a non-pulsating pump. In this step, the maximum pumping pressure was adjusted to 50 kg/cm² with a maximum and minimum pressure controller. After about 40 ml of the medium is flowed out of the tube from the lower end thereof, the pumping was stopped and the column was removed from the packer. To the top of the column, a clasp with a filter of 5 μm thickness was secured to obtain the liquid chromatography column of the present invention.

The free space (the space among the particles) was determined using a conventional mercury pressure method and was 2.52 ml. Therefore, the packing density of the column may be obtained as follows:

Free Space in the Packing = 2.52 ml.
Inner Volume of the Column = 10 cm × 8.5 mm = 5.67 ml.
Packing Density = 5.67 ml − 2.52 ml/5.67 ml × 100 = 55.5%

We claim:

1. A liquid chromatography column comprising: a hollow tube,
a packing contained in said tube, wherein said packing comprises an assemblage of hydroxyl apatite particles of substantially spherical shape, wherein the median of the particle size of said particles is from 1 to 10 μm, and at least 90% of said particles in said assemblage have a particle size of not more than 25 μm, and
a first filter mounted on a lower portion of said tube, said first filter having a pore size smaller than said hydroxyl apatite particles of said packing, wherein the packing density of said packing is at least 40%.

2. The liquid chromatography column of claim 1, wherein the packing density of said packing is at least 50%.

3. The liquid chromatography column of claim 2, wherein the packing density of said packing is at least 55%.

4. The liquid chromatography column of claim 3, wherein the packing density of said packing is at least 65%.

5. The liquid chromatography column of claim 4, wherein the packing density of said packing is at least 75%.

* * * * *